United States Patent
Zhao et al.

(10) Patent No.: US 11,611,664 B2
(45) Date of Patent: Mar. 21, 2023

(54) VOICE QUALITY ASSESSMENT SYSTEM

(71) Applicant: Agora Lab, Inc., Santa Clara, CA (US)

(72) Inventors: Xiaohan Zhao, Shanghai (CN); Ruofei Chen, Shanghai (CN); Siqiang Yao, Shanghai (CN); Fan Li, Shanghai (CN)

(73) Assignee: Agora Lab, Inc, Santa Clara, CA (US)

( * ) Notice: Subject to any disclaimer, the term of this patent is extended or adjusted under 35 U.S.C. 154(b) by 259 days.

(21) Appl. No.: 17/211,968

(22) Filed: Mar. 25, 2021

(65) Prior Publication Data

US 2022/0311867 A1   Sep. 29, 2022

(51) Int. Cl.
*H04M 7/00* (2006.01)
*H04M 3/22* (2006.01)
*H04L 65/80* (2022.01)

(52) U.S. Cl.
CPC .......... *H04M 7/0084* (2013.01); *H04L 65/80* (2013.01); *H04M 3/2227* (2013.01); *H04M 3/2254* (2013.01)

(58) Field of Classification Search
CPC ............. H04M 7/0084; H04M 3/2254; H04M 3/2227; H04L 65/80
See application file for complete search history.

(56) References Cited

U.S. PATENT DOCUMENTS

| | | | |
|---|---|---|---|
| 9,386,154 B2 | 7/2016 | Assem et al. | |
| 10,574,978 B1 | 2/2020 | He | |
| 2004/0085898 A1* | 5/2004 | Gass | H04L 47/2416 370/229 |
| 2007/0064616 A1* | 3/2007 | Miranda | H04L 65/80 370/252 |
| 2008/0212567 A1* | 9/2008 | El-Hennawey | H04L 65/1101 370/352 |
| 2018/0013879 A1* | 1/2018 | Kim | H04L 43/0829 |

OTHER PUBLICATIONS

QOS Research for Video Conference, Ling Bo, Zhejiang University, Apr. 2008.
Series P: Terminals and Subjective and Objective Assessment Methods, Telecommunication Standardization Sector of ITU (I n t e r n a t i o n a l T e l e c o m m u n i c a t i o n U n i o n), Oct. 2012.
The Gilbert-Elliott Model for Packet Loss in Real Time Services on the Internet, https://www.researchgate.net/publication/221440836, Oliver Hohlfeld, RWTH Aachen University, Jan. 2008.

* cited by examiner

*Primary Examiner* — Brenda H Pham
(74) *Attorney, Agent, or Firm* — The Law Offices of Konrad Sherinian, LLC; Depeng Bi

(57) ABSTRACT

A new audio quality assessment system includes an assessment system running in a receiver system of a VoIP communication system. The new audio quality assessment system determines an accurate MOS of a VoIP call within a time window. The audio quality assessment system determines an effective PLC counter, a PLC impact factor, an effective AS counter, an AS impact factor, a network impact factor, a codec type of the received voice packets, a bitrate of the received voice packets, an initial MOS from a configured codec-bitrate MOS table, and determines the accurate MOS based on these data. The determined MOS is more accurate and efficiently obtained since it is based on efficiently collected statistics of the receiver system's modules and a pre-configured codec-bitrate MOS table.

8 Claims, 10 Drawing Sheets

VOICE QUALITY ASSESSMENT SYSTEM

CROSS REFERENCE TO RELATED APPLICATIONS

NONE.

FIELD OF THE DISCLOSURE

The present invention generally relates to real-time communications, and more particularly relates to a VoIP system. More particularly still, the present disclosure relates to an audio quality assessment system that accurately estimate the MOS of a VoIP call of a VoIP communication system.

DESCRIPTION OF BACKGROUND

Voice over Internet Protocol (VoIP) represents a group of technologies for the delivery of voice communications and multimedia sessions over the Internet Protocol (IP) networks, such as the Internet. Data representing a participant of a VoIP session is sent to other participants' electronic devices, such as a smartphone, a tablet computer, a laptop computer or other types of mobile or portable electronic devices. Participants can also use a desktop computer to join the VoIP session. The receiving electronic devices receive the voice data (also referred to herein as audio data), which are usually in the form of packets, and play back the voice data to the corresponding participants.

Due to various reasons, such as packet jitter and packet loss, the received voice data may not be the same as the sender's voice data. Playing back the received voice data will then introduce hearing impairment to the listener. The characterization of the intensity of the impairment on the receiver side without any reference has been an open question in the industry. One common approach to characterize the impairment is to monitor the current network's state, such as packet loss rate and jitter length, within a given time segment (or window). The next step is to use the status of the underlying connection network to estimate the Mean Opinion Score (MOS). MOS is a commonly used measure in the domain of Quality of Experience (QoE) and telecommunications engineering. It represents the overall quality of a system and particularly the quality of audio communication. It is usually a subjective quality evaluation measure, Usually, the underlying technologies or systems are adjusted such that the estimated MOS is estimated as dose to a reference MOS obtained from a supervisor or observers as possible. Under such an approach, the estimated MOS is not reliable or accurate because the network's status and human's sense of hearing are not directly related. Furthermore, the conventional approach is intrusive.

Accordingly, there is a need for a new system and a new method to provide a new way to determine the audio quality in a real-time voice communication system, such as VoIP systems. As a parametric based non-intrusive audio quality assessment system, the new system assesses the audio quality by analyzing the audio data on the receiving end in each time interval (also referred to herein as time window) to provide a more accurately estimated MOS. This new estimated MOS can be used to monitor the quality of each voice call and diagnose QoE issues in the real-time voice communication system.

SUMMARY OF THE DISCLOSURE

Generally speaking, pursuant to the various embodiments, the present disclosure provides. a computer-implemented method for determining a MOS of a VoIP call over a VoIP communication system having a sender system and a receiver system. The method includes starting a MOS estimation process in the receiver system at a begging of a time window of a VoIP call. The receiver system includes a processing unit; a memory operatively coupled to the processing unit; an audio output interface operatively coupled to the processing unit; the network interface operatively coupled to the processing unit; an audio input interface operatively coupled to the processing unit; and an operating system executed by the processing unit. The method also includes determining a set of VoIP call statistics of the VoIP call; determining a PLC impact factor of the VoIP call; determining a first MOS influence factor based on the PLC impact factor and a PLC counter within the set of VoIP call statistics; determining an AS impact factor of the VoIP call; determining a second MOS influence factor based on the AS impact factor and an AS counter within the set of VoIP call statistics; determining a network impact factor; determining a third MOS influence factor based on the network impact factor; determining an initial MOS based on a codec type and a bitrate within the set of VoIP call statistics, and a set of codec-bitrate MOS reference values; and determining an estimated MOS of the VoIP call based on the initial NOS, the first influence factor, the second influence factor and the third influence factor. In one implementation, the first MOS influence factor is a product of the PLC impact factor and the PLC counter; and the second MOS influence factor is a product of the AS impact factor and the AS counter. The method may also include determining whether a received packet from the sender system is a voice packet; setting a voice flag on when the received packet is determined to be a voice packet; determining the bitrate after the voice flag is set to on; incrementing the PLC counter when the voice flag is on after a PLC operation; and incrementing the AS counter when the voice flag is on after an AS operation.

Further in accordance with the present teachings is an audio quality assessment system for determining a MOS of a VoIP call over a VoIP communication system having a sender system and a receiver system. The audio quality assessment system is adapted to start a MOS estimation process in the receiver system at a begging of a time window of a VoIP call. The receiver system includes a processing unit; a memory operatively coupled to the processing unit; an audio output interface operatively coupled to the processing unit; the network interface operatively coupled to the processing unit; an audio input interface operatively coupled to the processing unit; and an operating system executed by the processing unit. The audio quality assessment system is adapted to determine a set of VoIP call statistics of the VoIP call; determine a PLC impact factor of the VoIP call; determine a first MOS influence factor based on the PLC impact factor and a PLC counter within the set of VoIP call statistics; determine an AS impact factor of the VoIP call; determine a second MOS influence factor based on the AS impact factor and an AS counter within the set of VoIP call statistics; determine a network impact factor; determine a third MOS influence factor based on the network impact factor; determine an initial MOS based on a codec type and a bitrate within the set of VoIP call statistics, and a set of codec-bitrate MOS reference values; and determine an estimated MOS of the VoIP call based on the initial NOS, the first influence factor, the second influence factor and the third influence factor. In one implementation, the first MOS influence factor is a product of the PLC impact factor and the PLC counter; and the second MOS influence factor is a product of the AS impact factor and the AS counter. The audio quality assessment system is further adapted to determine whether a received packet from the sender system is a voice packet; set a voice flag on when the received packet is determined to be a voice packet; determine the bitrate after the voice flag is set to on; increment the PLC counter when the voice flag is on after a PLC operation; and increment the AS counter when the voice flag is on after an AS operation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
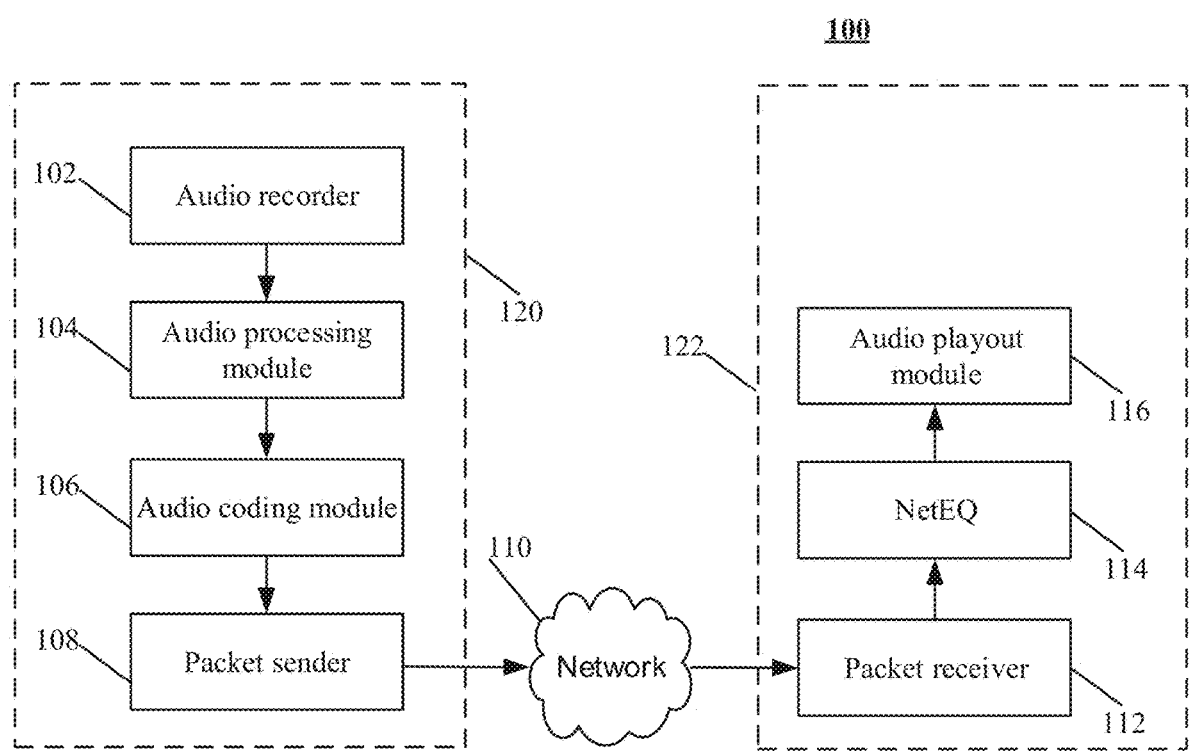
FIG. 1 is a block diagram of a prior art VoIP communication system.

A prior art VoIP communication system is shown and generally indicated at 100 in FIG. 1. The system 100 includes participating electronic devices 120 and 122 configured to communicate over a network (such as the Internet) 110. Each participating electronic device can send and receive audio and/or video data. When it sends data out, it is referred to herein as a sending device or sender. Likewise, it's referred to herein as a receiving device or receiver when it receives data. The electronic devices 120-122 can be, for example, desktop computers, laptop computers, tablet computers or smartphones with network connection capabilities.

Figure 2:
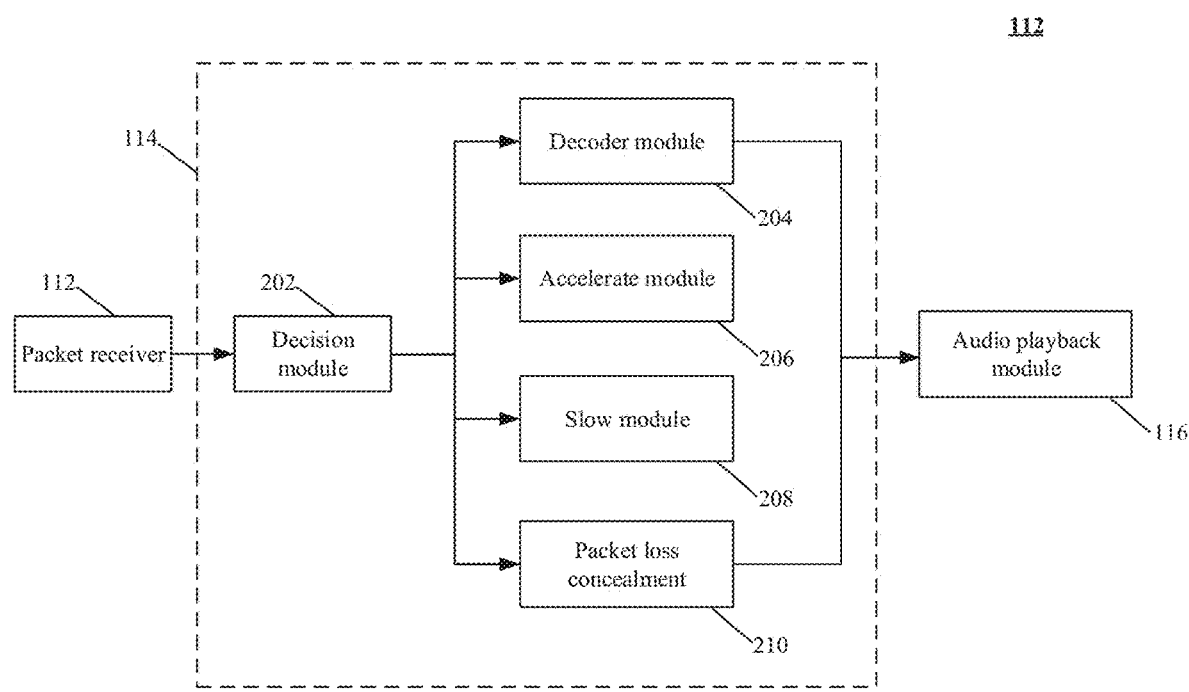
FIG. 2 is a block diagram of a prior art receiving device within a VoIP communication system.

The sender 120 includes an audio recorder (such as a microphone) device 102, an audio processing module 104, an audio coding module 106, a network packet sender module 108 for sending packets of audio and/or video data to the receiver 122 over a network interface. The audio processing module 104 performs, for example, echo cancellation and noise reduction on the sending end. The receiver 122 includes a network packet receiver module 112, a NetEQ module 114 and an audio playout module 116 for playing back the received audio data via an audio output interface (such as a speaker controller and a speaker). The NetEQ module 114 maintains a dynamic jitter buffer and runs an error concealment algorithm for concealing the negative effects of network jitter and packet loss. It tries to keep latency as low as possible while maintaining the voice quality as high as possible. The receiver 122 is further shown in FIG. 2. The NetEQ module 114 includes an audio data packet decision module 202, a decoder module 204, an accelerate module 206, a slow module 208 and an audio data packet loss concealment ("PLC") module 210. The modules 206-208 are collectively referred to herein as an AS module with A standing for Accelerate and S standing for Slow down or Slow.

The quality of a VoIP call is mainly affected by five categories of factors. The first one is volume of the voice recorded by the audio recorder 102. If the volume is not high enough, the coding damages and/or network damages on the voice is barely perceptible by the listener on the receiver end. The second category of factors that affect the quality of the VoIP call on the receiver end is the codec that causes coding damages to the audio data recorded by the audio recorder 102 and possibly processed by the audio processing module 104. The two main codec factors for assessing the codec damages to the VoIP call are the type of the codec and the encoding bitrate (such as 16 kbps) of the voice data. Codecs (such as Opus) differ in coding efficiency. For the same codec, the higher the bitrate is, the smaller the coding distortion to the voice is, and the higher the MOS is. The MOS of each codec at each different bitrate can be obtained from an offline configuration process.

The third category of factors that affect the quality of the VoIP call on the receiver end is the network conditions that cause damages (also referred to herein as network damages) to the voice data sent by the audio data packet sender 108. The communication network 110 oftentimes become unstable. In such a case, data packets will be lost or delayed during their transmission over the network 110, Theoretically, if data packets arrive at the receiver end 122 without any loss or delay, the audio quality of this VoIP call is only affected by the encoding damages. Once the network damage occurs, the data packets may not arrive at the receiving end or arrive with delays and jitters. In such cases, the audio quality at the receiver end will be negatively affected.

The fourth category of factors that affect the quality of the VoIP call on the receiver end is the network damage countermeasures performed by the receiver device 122. VoIP systems generally include modules, such as the modules 206-210 to reduce the impact of network damage. When the network damages are not present, the accelerate module 206, the slow down module 208 and the packet loss concealment module 210 are not executed. Otherwise, one or more of the three modules 206-210 operate to accelerate the audio, slow down the audio, and/or perform packet loss compensation to reduce the impact of packet delay and/or loss. The output of these modules thus affects the final voice signal directly. Accordingly, by directly monitoring each module's working status, the estimated MOS then better reflects the hearing sense of the VoIP system to a listener by the receiver 122. The fifth category of factors that affect the quality of the VoIP call on the receiver end includes echo cancellation and noise reduction performed by the audio processing module 104 on the sender end 120.

VoIP audio parametric based non-intrusive assessment method for determining the MOS of a VoIP communication system usually estimates MOS based on the third categories of influencing factors set forth above. One such method is the P.1201 standard for parametric non-intrusive assessment of audiovisual media streaming quality. The P.1201 standard is maintained by the International Telecommunication Union ("ITU"). The network related parameters that the P.1201 method relies on generally do not affect the hearing sense of the VoIP system to listeners. Accordingly, the audio MOS estimated by the P.1201 method is accurate only in a few network situations. Furthermore, in addition to packet loss, packet disorder also greatly affects the estimated MOS.

When packet delay changes, the VoIP system on the receiver end calls and executes the accelerate and/or slow modules to increase and/or decrease the voice packets' consumption speed. This operation negatively affects the sense of hearing on the receiver end. The more frequent the PLC and AS modules are executed, the worse the output voice quality on the receiver end. The actual impact on the sense of hearing on the receiver end by packet disorder is difficult to access at the parametric level. It means that it is extremely difficult for the conventional universal VoIP audio non-intrusive assessment method (such as P.1201) to be accurate in estimating the MOS of a VoIP call.

The present disclosure overcomes the drawbacks and shortcomings of the conventional method to estimate MOS of VoIP communication systems. In particular, the new non-intrusive audio quality assessment method and system by monitoring parameters that are more closely related to audio quality. The new system and method are based on the internal working status of the VoIP communication system. Compared with the conventional methods, the new system and method take into account almost all factors affecting the voice quality and lead to a more precisely estimated MOS. The VoIP working statuses include the codec type, the bitrate received by the decoder, the volume in the decoded frame, the number of frames generated by the PLC module, the number of frames influenced by the AS module, and the frame loss model. The new system and method track the statuses of modules (such as the modules 204-210) in a VoIP communication system, instead of only the state of the communication network 110.

Figure 3:
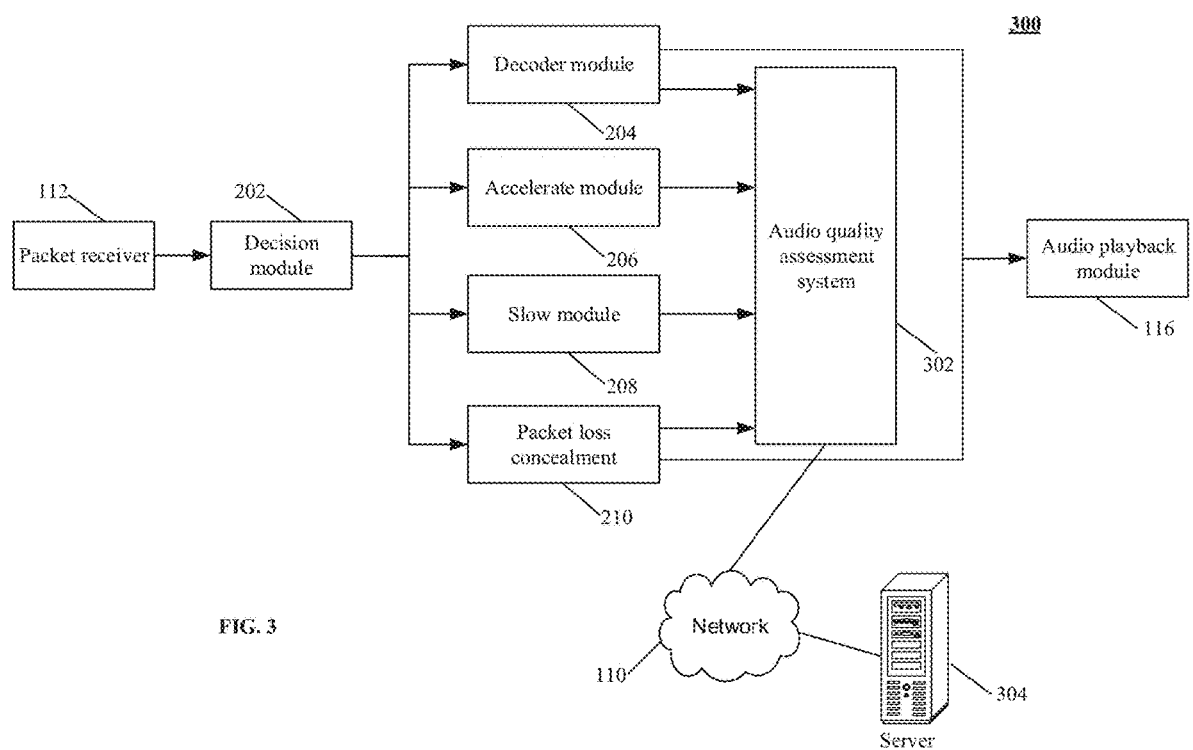
FIG. 3 is a block diagram of an improved receiving device within a VoIP communication system in accordance with this disclosure.

The new system and method are further illustrated by reference to FIGS. 3-10. Turning to FIG. 3, a block diagram of a new receiver system is shown and generally indicated at 300. The new receiver system 300 includes a processing unit, a memory operatively coupled to the processing unit, an audio output interface operatively coupled to the processing unit, the network interface operatively coupled to the processing unit, an audio input interface operatively coupled to the processing unit, and an operating system executed by the processing unit. The new receiver system 300 may further includes a video output interface operatively coupled to the processing unit, and a video input interface operatively coupled to the processing unit.

The improved VoIP receiver system further includes a non-intrusive audio quality assessment system 302. In one implementation, the assessment system 302 is a computer software application adapted to be executed by the processing unit. The assessment system 302 assesses the audio quality of a VoIP call based on the statistics of the components of the VoIP system on the receiver end. In a further implementation, the assessment system 302 communicates with a server (such as a cloud server) system 304 over the Internet 110. In such a case, the assessment system 302 provides assessment data and results to the server system 304. The new receiver system 300 and the assessment system 302 are further illustrated by reference to FIG. 4.

Figure 4:
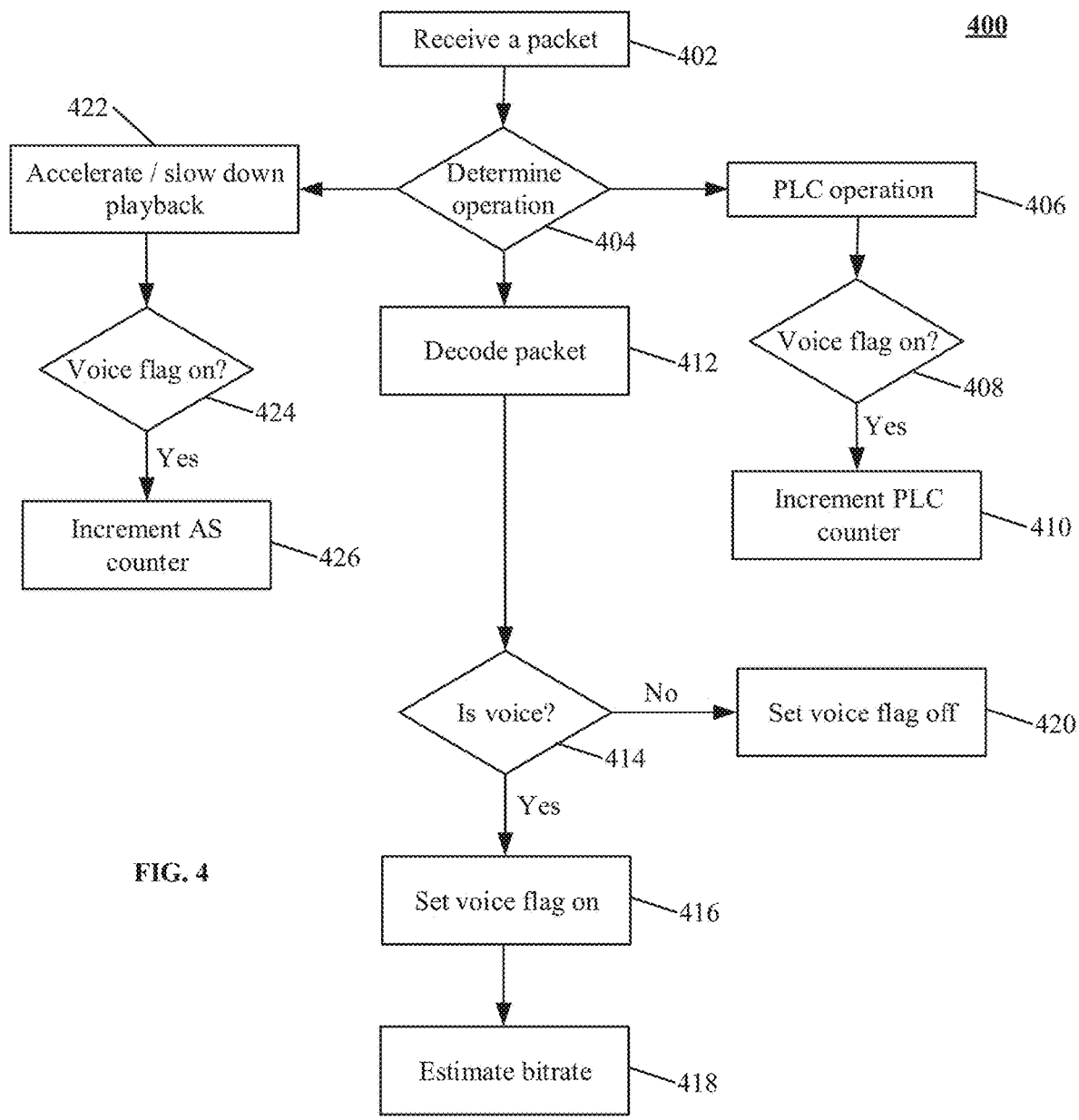
FIG. 4 is a flowchart illustrating a process by which a VoIP receiver system with a new audio quality assessment system determines the VoIP communication system statistics based on multiple categories of factors that affect the sense of hearing in accordance with this disclosure.

Referring now to FIG. 4, a flowchart illustrating a process by which a VoIP receiver system with a new audio quality assessment system determines the VoIP communication system statistics (also referred to herein as VoIP call statistics) based on multiple categories of factors that affect the sense of hearing is shown and generally indicated at 400. At 402, the data packet receiver 112 receives one or more data packet. For ease of reference, it is said herein that, at 402, a packet is received. The codec information can be retrieved from the received packet. The packet receiver 112 obtains the codec type and other codec information. The codec data is then used by the decoder module 204 to decode the received packet at 412.

For the received packet, at 404, the decision module 202 determines the operation on the packet. The operation can be a packet decoding operation performed by the decoder module 204 at 404, a PLC operation performed at 406 by the PLC module 210, an acceleration operation at 422 performed by the accelerate module 206, or a slowdown operation at 422 performed by the slow module 208. After the PLC operation, at 408, the assessment system 302 determines whether the voice flag is on. For example, the binary value TRUE indicates on while FALSE indicates off. If the voice flag is on, at 410, the assessment system 302 increments the effective PLC module counter. Otherwise, no operation (also referred to herein as NOP) is performed.

After the packet is decoded at 412, at 414, the assessment system 302 determines whether the packet is a voice data packet. If so, at 416, the assessment system 302 sets the voice flag to on. Otherwise, a NOP is performed by the assessment system 302. In other words, the assessment system 302 performs no operation on the packet. To determine whether the packet is a voice packet, one criteria is whether the volume is enough. The volume is compared to the predetermined voice volume threshold to determined whether the volume is enough. In one implementation, the volume of a constant voice signal is adjusted from zero and up. When the received voice is clearly heard, the corresponding volume is set as the threshold.

At 418, the assessment system 302 estimates the bitrate of the received voice data packet. For example, the assessment system 302 determines the encoding bitrate of the voice data packet using the bit stream length of the packet. After the accelerate module 206 or the slow module 208 operates on the received packet, at 424, the assessment system 302 determines whether the voice flag for the current time window is on. If so, at 426, the assessment system 302 increment the accelerate counter or the slowdown counter respectively. Otherwise, a NOP is performed by the assessment system 302. In one implementation, the acceleration counter and the slow down counter are the same counter, which is incremented when either of the accelerate module 206 and the slow module 208 is executed. In other words, when the AS module is performed on the packet at 422, at 426, the effective AS module counter is incremented.

It should be noted that the audio quality assessment is performed for a given time window. The time window can be, for example, five seconds or two minutes. At the beginning of each assessment time window, the voice flag is initialized as off, the PLC counter is initialized as zero, the acceleration counter is initialized as zero, and the slow down counter is initialized as zero. When the acceleration counter and the slow down counter are combined into the same AS counter, the AS counter is initialized to zero at the beginning of each assessment time window. The PLC counter, the acceleration counter, the slow down counter and the AS counter are referred to herein as NetEQ statuses. The NetEQ statuses are also referred to herein as VoIP module statistics, NetEQ module statuses and NetEQ module statistics.

Figure 5:
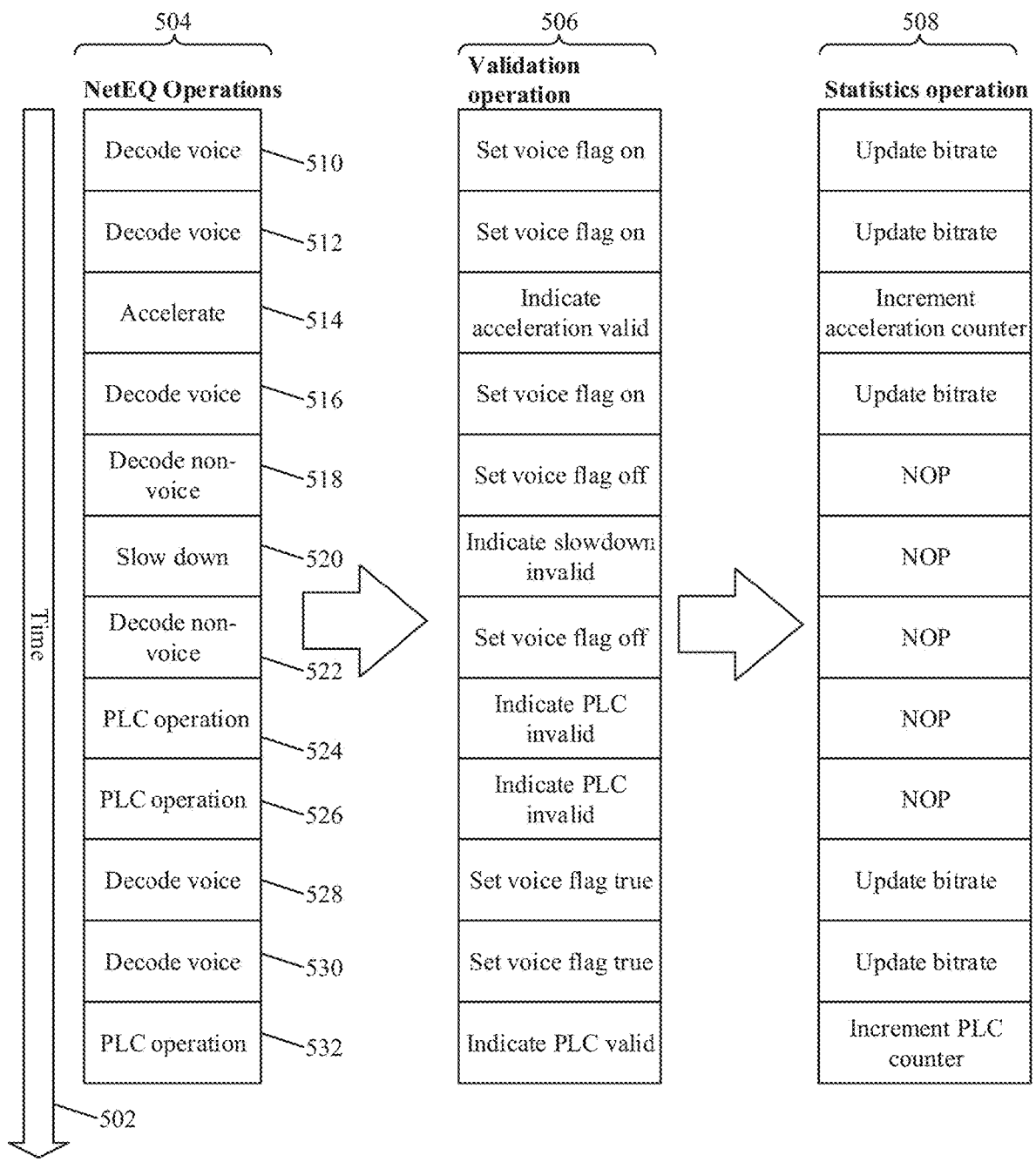
FIG. 5 is a block diagram illustrating the operation of an improved receiving device within a VoIP communication system in accordance with this disclosure.

The operation of the new receiver system 300 is further illustrated in FIG. 5 and generally indicated at 500. The time line of a time window is indicated at 502, The operations of the NetEQ modules 204-210 along the time line 502 are indicated at the column 504. The corresponding operations performed by the assessment system 302 are indicated at the columns 506 and 508. Along the time line 502, the NetEQ modules 204-210 perform the operations 510-532. For each such operation, the assessment system 302 performs corresponding operations shown in columns 506-508.

For operations 510-512,516,528-530, voice packets are decoded. Correspondingly, the assessment system 302 sets the voice flag on, and updates bitrate at 418. For operation 514, the acceleration is a valid acceleration. Accordingly, the valid acceleration is indicated and the acceleration counter (or AS counter) is incremented. In one implementation, when the voice flag is on, the operation 514 is termed herein to be a valid operation or an effective operation that affects the sense of hearing. Otherwise, it is termed an invalid operation or an ineffective operation that does not affect the sense of hearing.

For operations 518,522, non-voice packets are decoded. Correspondingly, the assessment system 302 sets the voice flag off. For operations 520, the slowdown operation happens to be an invalid slowdown operation. In such a case, the assessment system 302 indicates that the slowdown operation is invalid, and performs no additional operation on this packet. In one implementation, when the voice flag is on, the operation 520 is termed to be a valid slowdown operation or an effective slowdown operation that affects the sense of hearing. Otherwise, it is termed herein as an invalid slowdown operation or an ineffective slowdown operation that does not affect the sense of hearing.

For operations 524-526, they are invalid PLC operations. In such a case, the assessment system 302 indicates the same and performs no more operations related to the corresponding packets. In one implementation, when the voice flag is on, the operation 524-526 are termed to be valid PLC operations or effective PLC operations that affects the sense of hearing, Otherwise, they are termed invalid PLC operations or ineffective PLC operation that do not affect the sense of hearing. In contrast, the operation 532 is a valid PLC operation. In such a case, the assessment system 302 indicates that it's valid and increments the PLC counter.

Figure 6:
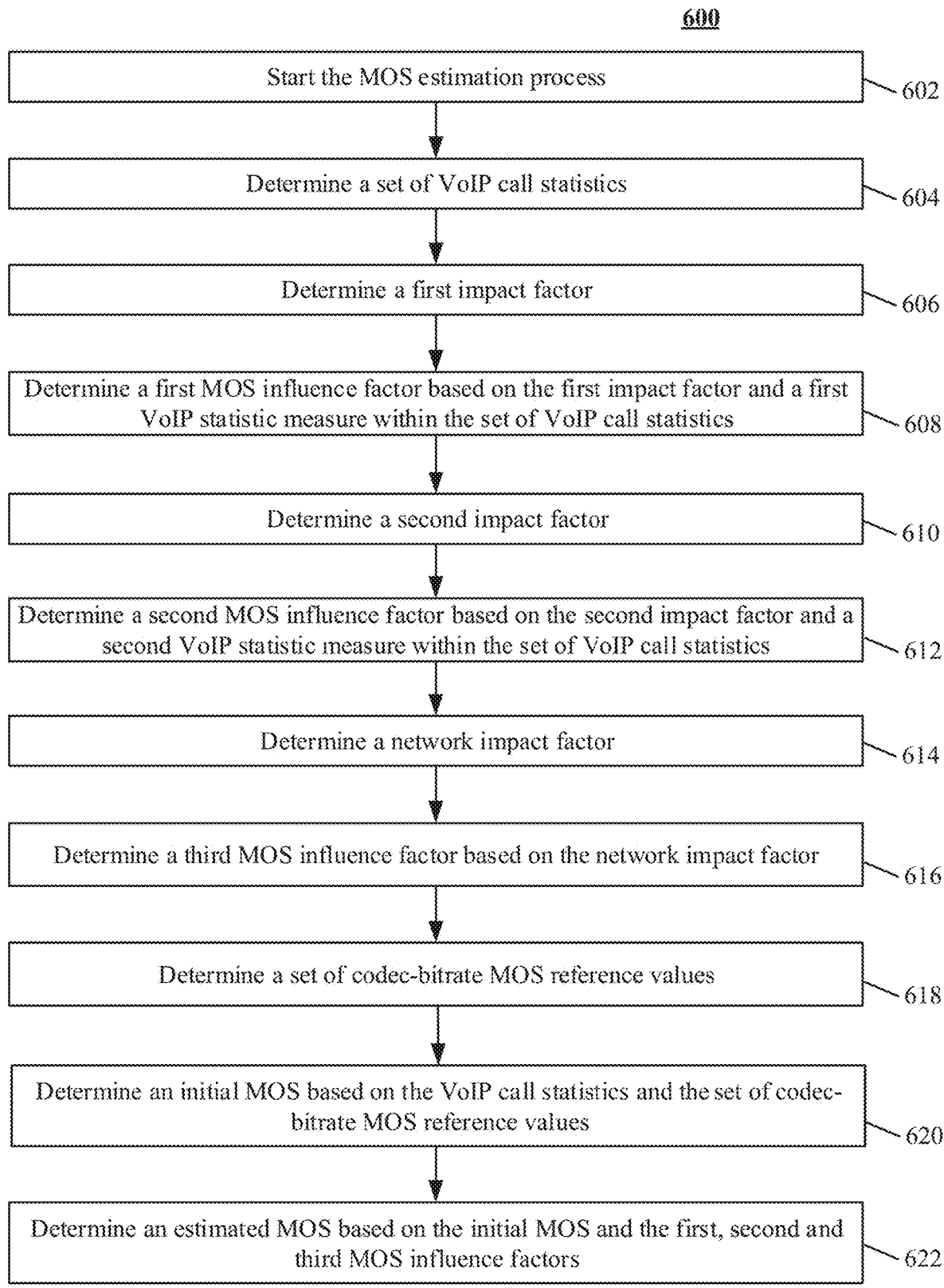
FIG. 6 is a flowchart illustrating a process by which a no reference audio quality assessment system accurately estimates the MOS of a VoIP call in accordance with this disclosure.

The no reference audio quality assessment is further illustrated by reference to FIG. 6. Referring to FIG. 6, a flowchart illustrating a process by which the assessment system 302 more accurately estimates the MOS of the VoIP call is shown and generally indicated at 600. At 602, the assessment system 302 starts the estimation process at the beginning a time window. For instance, the assessment system 302 starts the estimation process with initializations of the effective PLC counter to zero, the effective AS module counter to zero, the voice flag to off, and the estimated bitrate to zero. At 604, the assessment system 302 determines a set of VoIP call statistics. For instance, at 604, the assessment system 302 performs the process 400 to obtain the VoIP statistics, such as the codec type, bitrate, PLC counter and AS counter. At 606, the assessment system 302 determines a first impact factor. In one implementation, the first impact factor is a PLC impact factor. At 608, the assessment system 302 determines a first MOS influence factor based on the first impact factor and a first statistic (such as the effective PLC counter) within the set of VoIP statistics. The effective PLC counter is the final value at the end of the time window. In one implementation, the first MOS influence factor $IF_1$ is determined by the formula below:

$$IF_1 = m * g_1$$

m stands for the PLC counter while $g_1$ stands for the PLC impact factor. At 610, the assessment system 302 determines a second impact factor. In one implementation, the second impact factor is an AS impact factor. At 612, the assessment system 302 determines a second MOS influence factor based on the second impact factor and a second VoIP statistic (such as the effective AS counter) within the set of VoIP statistics. The effective AS counter is the final value at the end of the time window. In one implementation, the second MOS influence factor $IF_2$ is determined by the formula below:

$$IF_2 = n * g_2$$

n stands for the AS counter while $g_2$ stands for the AS impact factor. At 614, the assessment system 302 determines a network impact factor. At 616, the assessment system 302 determines a third MOS influence factor (represented herein by $IF_3$) based on the network impact factor. At 618, the assessment system 302 determines a set of codec-bitrate MOS reference values. The set of values can be, for example, a table of values with codec types and different bitrates as separate dimensions/axises. For a particular codec type and a particular bitrate, a corresponding MOS reference value is located inside the codec-bitrate MOS table. It should be noted that the element 618 is usually performed outside of the current time window. It is a configuration process that is usually conducted separately.

At 620, based on the codec type and the bitrate determined by the process 400, the assessment system 302 determines an initial MOS value, $MOS_{initial}$, from the set of codec-bitrate MOS reference values. At 622, the assessment system 302 determines an estimated MOS based on the initial MOS and the first, second and third MOS influence factors. In one implementation, the more accurately estimated MOS is determined by the formular below:

$$\text{Estimated MOS} = MOS_{initial} * (100 - IF_1 - IF_2) * IF_3$$

Figure 7:
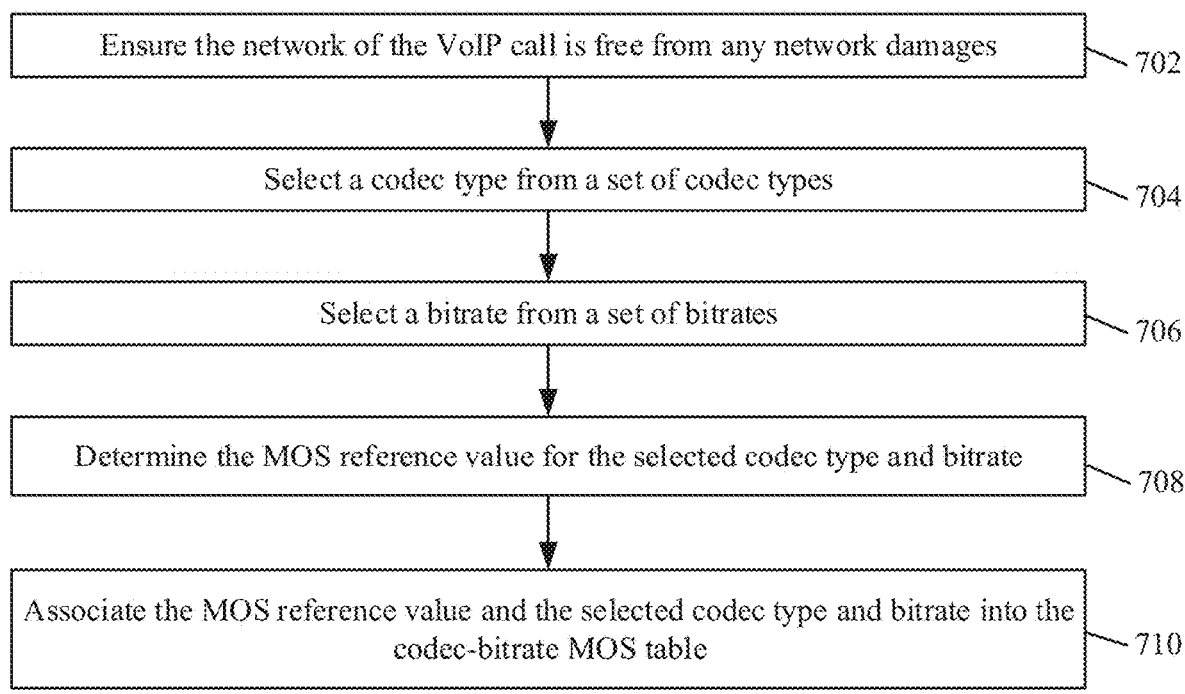
FIG. 7 is a flowchart illustrating a process by which a codec-bitrate MOS table is determined in accordance with this disclosure.

The process for determining the codec-bitrate MOS table at 618 is further shown in FIG. 7. Turning to FIG. 7, a flowchart illustrating a process by which the codec-bitrate MOS table is determined is shown and generally indicated at 700. At 702, a network of a VoIP call is configured to be free of network damages to voice quality. At 704, an assessment configuration system selects a codec from a set of codec types. The assessment configuration system, in one implementation, is a separate configuration or testing system for determining the codec-bitrate MOS table and the PLC AS and network impact factors. The assessment configuration system includes a software application program. As used herein, the assessment configuration system and the assessment system 302 are collectively referred to as an audio quality assessment system.

At 706, the assessment configuration system selects a bitrate from a set of bitrates. At 708, the assessment configuration system determines a MOS of the VoIP call using the selected codec type and bitrate. In one implementation, the MOS value is obtained by following the POLQA standard for benchmarking voice quality of over IP based networks. The POLQA is standardized by the International Telecommunication Union as Recommendation P.863. Alternatively, it is obtained using a subjective speech quality assessment method.

The element 708 is repeated for all combinations of the et codec types and the set of bitrates. At 710, each determined MOS value and the corresponding selected codec type and bitrate are associated in the codec-bitrate MOS table.

Figure 8:
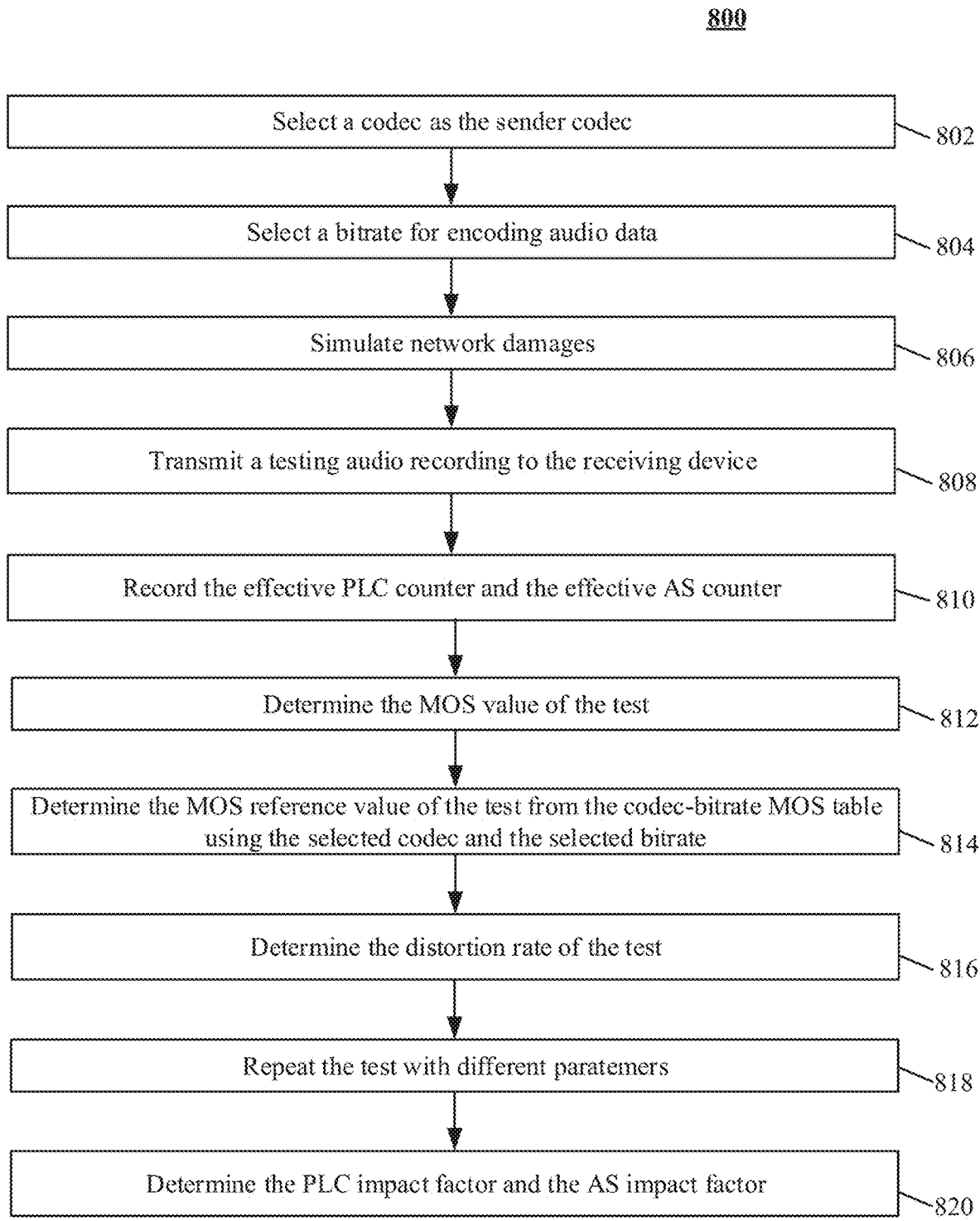
FIG. 8 is a flowchart illustrating a process by which an assessment configuration system determines the module impact factors in accordance with this disclosure.

The PLC impact factor and the AS impact factor are determined by a process shown in FIG. 8. Referring to FIG. 8, a flowchart illustrating a process by which the assessment configuration system determines the PLC and AS impact factors is shown and generally indicated at 800. At 802, the assessment configuration system selects a codec as the sender codec. At 804, it selects a bitrate for encoding audio data. At 806, the assessment configuration system simulates network damages using, for example, the second-order Gilbert-Elliot model. In this modeling, the packet loss probability p is set randomly while the recovery rate r is set to 1. At 808, the assessment configuration system transmits a testing audio to the receiving device. At 810, the assessment configuration system records the effective PLC counter $m_x$ and the effective AS counter $n_x$. At 812, the assessment configuration system determines the MOS value ($MOS_{test}$) of the test by following the P.863 standard. At 814, the assessment configuration system uses the selected codec and the selected bitrate to locate the MOS reference value ($MOS_{max}$) from the codec-bitrate MOS table. At 816, the assessment configuration system determines the distortion rate of the test. For example, the distortion rate is set using the formula below:

$$DR_x = MOS_{test}/MOS_{max}$$

The distortion rate and the impact factors fit the following relationship:

$$(1-m_x*g_1-n_x*g_2)=DR_x$$

where x indicates the test. At 818, the assessment configuration system repeats the test with different parameters, such as different code types and bitrates. After two or more tests, at 820, the assessment configuration system determines the PLC impact factor and the AS impact factor using, for example, algebraic operations.

Figure 9:
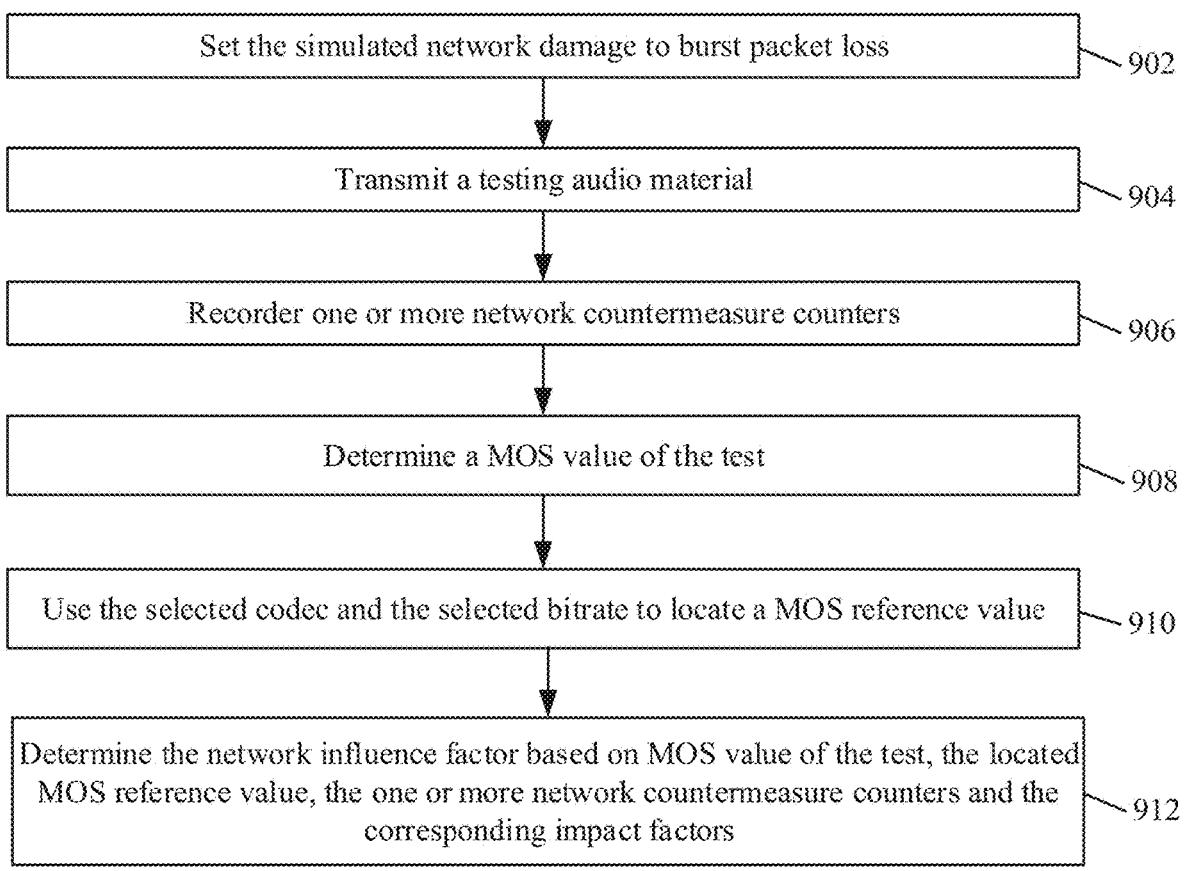
FIG. 9 is a flowchart illustrating a process by which an assessment configuration system determines a network impact factor in accordance with this disclosure.

The network factor is determined using a process shown in FIG. 9. Referring to FIG. 9, a flowchart illustrating a process by which the assessment configuration system determines the network impact factor is shown and generally indicated at 900. To obtain the network impact factor, the assessment configuration system first needs to determine whether the current network is dominated by burst packet loss or random packet loss. Burst loss means continuous packet loss, while random loss means discontinuous frame loss. With the same effective PLC counter, different loss types will bring a different sense of hearing to the listeners on the receiver device side. Accordingly, it is necessary to fine-tune the predicted MOS score based on the packet loss status. As used herein, p stands for the packet loss probability while r stands for the packet recovery rate.

In the test referenced in the process 800, after the impactor factors $g_1$ and $g_2$ are determined, at 902, the assessment configuration system gradually sets the simulated network damage to burst packet loss, i.e., setting p randomly while reducing r in the Gilbert-Elliot model close to 0, such as 0.01. At 904, the assessment configuration system transmits testing audio material. At 906, the assessment configuration system then records the effective PLC module counter $m_1$ and AS module counter $n_1$. At 908, the assessment configuration system determines the MOS value ($MOS_{test}$) of the test by following the P.863 standard. At 910, the assessment configuration system uses the selected codec and the selected bitrate to locate the MOS reference value ($MOS_{max}$) from the codec-bitrate MOS table. At 912, the assessment configuration system determines the network influence factor for a particular pair of p and r using the formula below;

$$IF_3 = MOS_{max}*(1-m1*g_1-n1*g_2)/MOS_{test}$$

Figure 10:
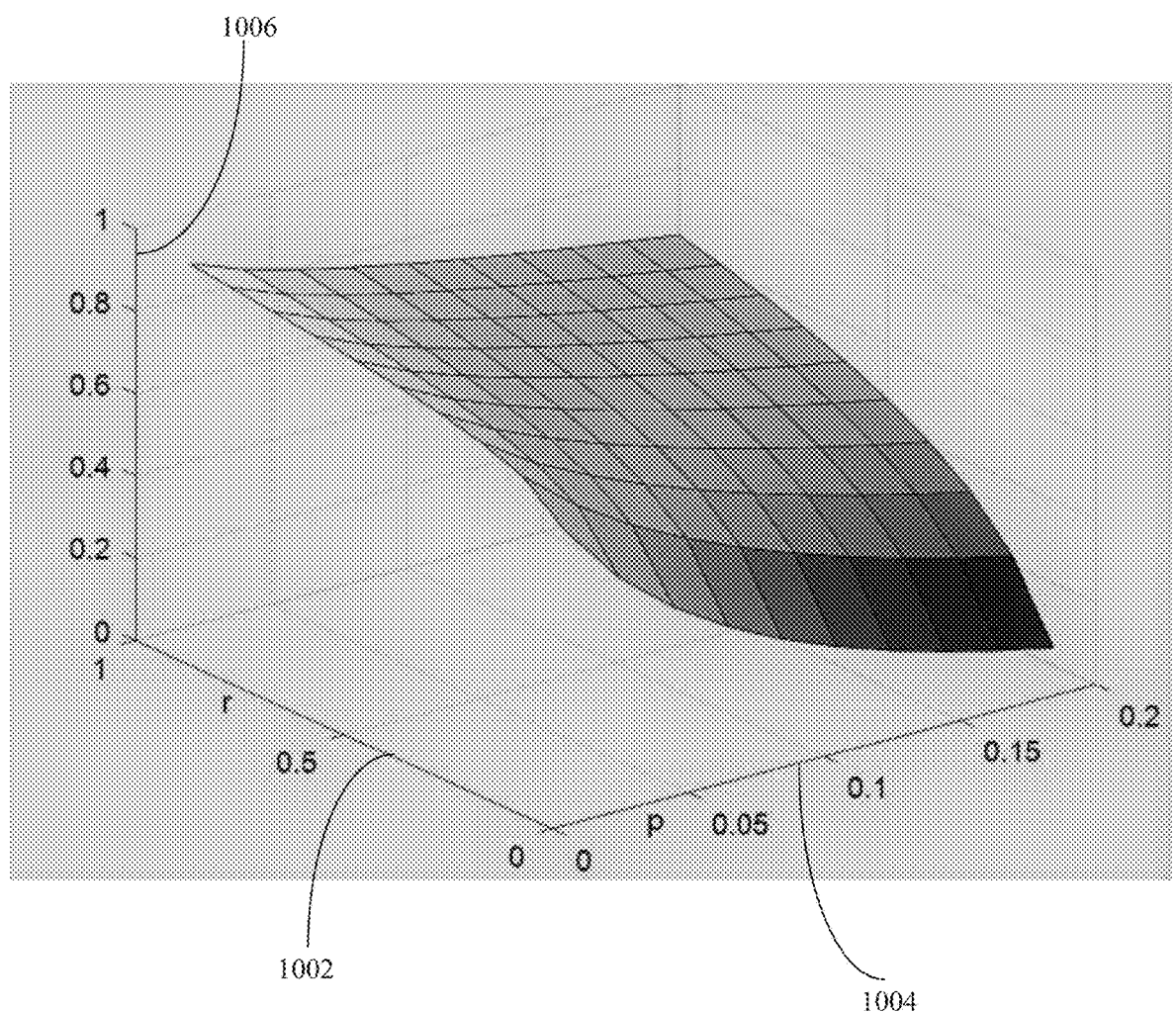
FIG. 10 is a matrix graph illustrating the relationship between a network impact factor, packet loss probability and packet recovery rate within a VoIP communication system in accordance with this disclosure.

The relationship between $IF_3$ and p and r is further shown in FIG. 10. Turning to FIG. 10, a diagram illustrating the relationship between $IF_3$ and p and r is shown and generally indicated at 1000. The r axis, p axis and $IF_3$ axis are indicated at 1002, 1004 and 1006 respectively.

Obviously, many additional modifications and variations of the present disclosure are possible in light of the above teachings. Thus, it is to be understood that, within the scope of the appended claims, the disclosure may be practiced otherwise than is specifically described above. For example, some VoIP communication systems may not have some modules mentioned above, or may include additional modules. When a module does not exist in a VoIP call system, the module's influence on the final output voice quality will not exist. When a VoIP system has an additional module, the additional module will affect the final output voice quality measure. Using the present teachings, the additional module's influence factor can also be quantified and integrated into the non-reference audio quality assessment system. In such a case, a pair of elements (such as 406-408, 410-412) will be present for the additional module.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer-implemented method for determining a MOS of a VoIP call over a VoIP communication system having a sender system and a receiver system, said method comprising:
   1) starting a MOS estimation process in said receiver system at a begging of a time window of a VoIP call, said receiver system having:
      (a) a processing unit;
      (b) a memory operatively coupled to said processing unit;
      (c) an audio output interface operatively coupled to said processing unit;
      (d) said network interface operatively coupled to said processing unit;
      (e) an audio input interface operatively coupled to said processing unit; and
      (f) an operating system executed by said processing unit;
   2) determining a set of VoIP call statistics of said VoIP call;
   3) determining a PLC impact factor of said VoIP call;
   4) determining a first MOS influence factor based on said PLC impact factor and a PLC counter within said set of VoIP call statistics;
   5) determining an AS impact factor of said VoIP call;
   6) determining a second MOS influence factor based on said AS impact factor and an AS counter within said set of VoIP call statistics;
   7) determining a network impact factor;
   8) determining a third MOS influence factor based on said network impact factor;
   9) determining an initial MOS based on a codec type and a bitrate within said set of VoIP call statistics, and a set of codec-bitrate MOS reference values; and
   10) determining an estimated MOS of said VoIP call based on said initial NOS, said first influence factor, said second influence factor and said third influence factor.

2. The method for determining a MOS of a VoIP call over a VoIP communication system of claim 1 wherein:
   1) said first MOS influence factor is a product of said PLC impact factor nd said PLC counter; and
   2) said second MOS influence factor is a product of said AS impact factor and said AS counter.

3. The method for determining a MOS of a VoIP call over a VoIP communication system of claim 1 wherein said estimated MOS is determined by:

Estimated MOS=$MOS_{initial}*(1-IF_1-IF_2)*IF_3$

Wherein $MOS_{initial}$ stands for said initial MOS, $IF_1$ stands for said first MOS influence factor, $IF_2$ stands for said second MOS influence factor, and $IF_3$ stands for said third MOS influence factor.

4. The method for determining a MOS of a VoIP call over a VoIP communication system of claim 1 further comprising:
   1) determining whether a received packet from said sender system is a voice packet;
   2) setting a voice flag on when said received packet is determined to be a voice packet;
   3) determining said bitrate after said voice flag is set to on;
   4) incrementing said PLC counter when said voice flag is on after a PLC operation; and
   5) incrementing said AS counter when said voice flag is on after an AS operation.

5. An audio quality assessment system for determining a MOS of a VoIP call over a VoIP communication system having a sender system and a receiver system, said audio quality assessment system adapted to:
   1) start a MOS estimation process in said receiver system at a begging of a time window of a VoIP call, said receiver system having:
      (a) a processing unit;
      (b) a memory operatively coupled to said processing unit;
      (c) an audio output interface operatively coupled to said processing unit;
      (d) said network interface operatively coupled to said processing unit;
      (e) an audio input interface operatively coupled to said processing unit; and
      (f) an operating system executed by said processing unit;
   2) determine a set of VoIP call statistics of said VoIP call;
   3) determine a PLC impact factor of said VoIP call;
   4) determine a first MOS influence factor based on said PLC impact factor and a PLC counter within said set of VoIP call statistics;
   5) determine an AS impact factor of said VoIP call;
   6) determine a second MOS influence factor based on said AS impact factor and an AS counter within said set of VoIP call statistics;
   7) determine a network impact factor;
   8) determine a third MOS influence factor based on said network impact factor;
   9) determine an initial MOS based on a codec type and a bitrate within said set of VoIP call statistics, and a set of codec-bitrate MOS reference values; and
   10) determine an estimated MOS of said VoIP call based on said initial NOS, said first influence factor, said second influence factor and said third influence factor.

6. The audio quality assessment system of claim 5 wherein:
   1) said first MOS influence factor is a product of said PLC impact factor and said PLC counter; and
   2) said second MOS influence factor is a product of said AS impact factor and said AS counter.

7. The audio quality assessment system of claim 5 wherein said estimated MOS is determined by:

Estimated MOS=$MOS_{initial}*(1-IF_1-IF_2)*IF_3$

Wherein $MOS_{initial}$ stands for said initial MOS, $IF_1$ stands for said first MOS influence factor, $IF_2$ stands for said second MOS influence factor, and $IF_3$ stands for said third MOS influence factor.

8. The audio quality assessment system of claim 5 wherein said audio quality assessment system is further adapted to:
   1) determine whether a received packet from said sender system is a voice packet;
   2) set a voice flag on when said received packet is determined to be a voice packet;
   3) determine said bitrate after said voice flag is set to on;
   4) increment said PLC counter when said voice flag is on after a PLC operation; and
   5) increment said AS counter when said voice flag is on after an AS operation.

* * * * *